United States Patent
Zhang et al.

(10) Patent No.: US 9,824,212 B2
(45) Date of Patent: Nov. 21, 2017

(54) METHOD AND SYSTEM FOR RECOGNIZING ADVERTISEMENT PLUG-INS

(71) Applicants: BEIJING QIHOO TECHNOLOGY COMPANY LIMITED, Beijing (CN); QIZHI SOFTWARE (BEIJING) COMPANY LIMITED, Beijing (CN)

(72) Inventors: Di Zhang, Beijing (CN); Chun Tang, Beijing (CN)

(73) Assignees: BEIJING QIHOO TECHNOLOGY COMPANY LIMITED, Beijing (CN); QIZHI SOFTWARE (BEIJING) COMPANY LIMITED, Beijing (CN)

( * ) Notice: Subject to any disclaimer, the term of this patent is extended or adjusted under 35 U.S.C. 154(b) by 0 days.

(21) Appl. No.: 14/783,042

(22) PCT Filed: Jan. 27, 2014

(86) PCT No.: PCT/CN2014/071596
§ 371 (c)(1),
(2) Date: Oct. 7, 2015

(87) PCT Pub. No.: WO2014/166312
PCT Pub. Date: Oct. 16, 2014

(65) Prior Publication Data
US 2016/0063244 A1 Mar. 3, 2016

(30) Foreign Application Priority Data
Apr. 8, 2013 (CN) .......................... 2013 1 0119812

(51) Int. Cl.
*G06F 21/56* (2013.01)
*G06F 21/55* (2013.01)
(Continued)

(52) U.S. Cl.
CPC ........ *G06F 21/552* (2013.01); *G06F 17/3069* (2013.01); *G06F 21/56* (2013.01);
(Continued)

(58) Field of Classification Search
CPC ......................................... G06F 21/56–21/567
See application file for complete search history.

(56) References Cited

U.S. PATENT DOCUMENTS 8,516,590 B1 * 8/2013 Ranadive ............ H04L 63/1433
713/187
2009/0094175 A1 * 4/2009 Provos ................... G06F 21/577
706/12
(Continued)

FOREIGN PATENT DOCUMENTS

| CN | 102025636 A | 4/2011 |
|----|-------------|--------|
| CN | 102831338 A | 12/2012 |
| CN | 102833347 A | 12/2012 |

OTHER PUBLICATIONS

Grace et al., "Unsafe Exposure Analysis of Mobile In-App Advertisements", 2012, pp. 101-112.*
(Continued)

*Primary Examiner* — Thaddeus Plecha
(74) *Attorney, Agent, or Firm* — Baker & Hostetler LLP

(57) ABSTRACT

Disclosed are a method and apparatus for recognizing advertisement plug-ins, relating to the field of computer technologies. The method comprises: searching for files related to application plug-ins; based on feature vectors of feature dimensions in a feature vector set of a predetermined advertisement, scanning the files related to the application plug-ins, and calculating feature vector similarity between data in each file and the feature vector in each feature dimension; calculating an advertisement similarity of a current application plug-in according to the feature vector similarity of each feature dimension and a feature recogni-
(Continued)

tion weight of the feature dimension; comparing the advertisement similarity with a threshold, and determining whether the application plug-in is an advertisement plug-in according to the comparison result. The method has the advantageous effects that a perfect feature recognition rule is involved, and there is a superior feature matching and recognition capability for obfuscated advertisement software codes.

17 Claims, 6 Drawing Sheets

(51) Int. Cl.
    *H04N 21/44*     (2011.01)
    *H04N 21/442*     (2011.01)
    *H04N 21/443*     (2011.01)
    *H04N 21/81*     (2011.01)
    *G06F 17/30*     (2006.01)
    *G06Q 30/02*     (2012.01)

(52) U.S. Cl.
    CPC ... *G06Q 30/0241* (2013.01); *H04N 21/44008* (2013.01); *H04N 21/4424* (2013.01); *H04N 21/4431* (2013.01); *H04N 21/812* (2013.01); *H04N 21/8193* (2013.01); *G06F 2221/034* (2013.01)

(56) References Cited

U.S. PATENT DOCUMENTS

| | | | | |
|---|---|---|---|---|
| 2012/0311708 | A1* | 12/2012 | Agarwal | G06F 21/55 726/24 |
| 2013/0151063 | A1* | 6/2013 | Baughman | G01M 17/00 701/29.1 |
| 2013/0326477 | A1* | 12/2013 | Wyatt | G06F 8/70 717/120 |

OTHER PUBLICATIONS

"Android"; http://www.2cto.com/kf/201301/182717.html; Jan. 12, 2013; 4 pages.

* cited by examiner

US 9,824,212 B2

METHOD AND SYSTEM FOR RECOGNIZING ADVERTISEMENT PLUG-INS

CROSS REFERENCE TO RELATED APPLICATIONS

This application is the National Stage of International Application No. PCT/CN2014/071596, filed Jan. 27, 2014, which is based upon and claims priority to Chinese Patent Application No. CN201310119812.3, filed Apr. 8, 2013, the entire contents of all of which are incorporated herein by reference.

FIELD OF THE INVENTION

The present invention relates to the field of computer technologies and, more particularly, to a method and system for recognizing advertisement plug-ins, a computer program and a computer readable medium.

BACKGROUND OF THE INVENTION

With the development of technology, intelligent mobile terminals, such as a smart phone employing Android (which is a free and source code opened operating system based on Linux), iPhone and the like, have been more and more widely used. As the intelligent mobile terminals (for example, smart phone) are widely used, a variety of mobile applications spring up on the intelligent mobile terminals. Meanwhile, increased advertisement plug-ins are embedded in the applications. Malicious advertisement software may at least disturb a user, or for the worse may cause the leakage of privacy of the user. For a user of mobile phone, the malicious advertisement software may be more likely to consume a great amount of data traffic, or even to unknowingly send SMS with payment, bringing all kinds of losses to the user.

In order to prevent the user from harm of malicious advertisement, the first step is to recognize which application is advertisement software and what kinds of harms it has. Thus the user may know whether or not the advertisement software is a malicious advertisement and its harmful program, and then may optionally remove this software. Meanwhile this may further provide data support for advertisement block.

At present, for the advertisement plug-in recognition, most of intelligent mobile terminals determine whether an application is an advertisement plug-in only by simply and routinely detecting a title of an advertisement module. However, since some advertising parts embed the advertisement module into the application such that obfuscated advertisement software codes possibly have no apparently distinguishable title of module, the advertisement plug-in could not be accurately recognized in the prior art and thus the advertisement plug-in may have a low recognition rate.

SUMMARY OF THE INVENTION

In light of above problems, there is provided a method for recognizing advertisement plug-ins and a system for recognizing advertisement plug-ins, a computer program and a computer readable medium to overcome or at least partially solve above problems.

According to an aspect of the invention, there is provided a method for recognizing advertisement plug-ins, comprising:

searching for files related to application plug-ins;
based on feature vectors of feature dimensions in a feature vector set of a predetermined advertisement, scanning the files related to the application plug-ins, and calculating a feature vector similarity between data in each file and the feature vector in each feature dimension;
calculating an advertisement similarity of a current application plug-in according to the feature vector similarity in each feature dimension and a feature recognition weight in the feature dimension; and
comparing the advertisement similarity with a threshold, and determining whether the application plug-in is an advertisement plug-in according to the comparison result.

According to another aspect of the invention, there is also provided a system for recognizing advertisement plug-ins, including:
a processor; and
a memory for storing instructions executable by the processor,
wherein the processor is configured to:
search for files related to application plug-ins;
based on feature vectors of feature dimensions in a feature vector set of a predetermined advertisement, scan the files related to the application plug-ins, and calculate a feature vector similarity between data in each file and the feature vector in each feature dimension;
calculate an advertisement similarity of a current application plug-in according to the feature vector similarity in each feature dimension and a feature recognition weight in the feature dimension; and
compare the advertisement similarity with a threshold, and determine whether the application plug-in is an advertisement plug-in according to the comparison result.

According to another aspect of the invention, there is also provided a computer readable medium, which stores therein computer program that, when executed by one or more processors of a system for recognizing advertisement plug-ins, causes the system to perform:

searching for files related to application plug-ins;
based on feature vectors of feature dimensions in a feature vector set of a predetermined advertisement, scanning the files related to the application plug-ins, and calculating a feature vector similarity between data in each file and the feature vector in each feature dimension;
calculating an advertisement similarity of a current application plug-in according to the feature vector similarity in each feature dimension and a feature recognition weight in the feature dimension; and
comparing the advertisement similarity with a threshold, and determining whether the application plug-in is an advertisement plug-in according to the comparison result.

The invention has the beneficial effects of:

The method for recognizing advertisement plug-ins according to the invention can analyse feature data in various feature dimensions for the application plug-ins of smart terminal and comprehensively determine whether the application plug-ins contain the advertisement plug-ins in conjunction with feature data in various feature dimensions. As a result, it is possible to solve problems in the prior art that the advertisement plug-ins cannot be recognized in an accurate way, advertisement plug-in recognition cannot be performed on an obfuscated application and the advertisement plug-in recognition rate is lower. Also, it is possible to achieve the advantageous effects that a perfect feature recognition rule is involved, feature recognition can be implemented in conjunction with cloud data, advertisement software can be recognized in a precise and accurate way, there is a superior feature matching and recognition capability for obfuscated advertisement software codes, and effective behavior detection can be implemented for the recognized advertisement plug-ins.

The above description is merely an overview of technical solutions of the present invention. In order to more clearly understand the technical solutions of the present invention to implement in accordance with the contents of the description, and to make the foregoing and other objects, features and advantages of the invention more apparent, detailed embodiments of the invention will be provided below.

BRIEF DESCRIPTION OF THE DRAWINGS

Through reading the detailed description of preferred embodiments hereinafter, various other advantages and benefits will become apparent to those skilled in the art. Accompanying drawings are provided merely for the illustrative purpose of the preferred embodiments and should not be considered as limiting of the present invention. Same components are indicated by the same reference numerals throughout the accompanying drawings, in which.

DETAILED DESCRIPTION OF THE EMBODIMENTS

Hereinafter, exemplary embodiments of the disclosure will be described in detail with reference to figures. Although the exemplary embodiments of the disclosure are shown in the figures, it should be understood that the disclosure embodied in various forms will not be limited by the embodiments as set forth herein. In contrast, the embodiments are provided for more thoroughly understanding the disclosure and completely conveying a scope of the disclosure to those skilled in the art.

First Embodiment

Figure 1:
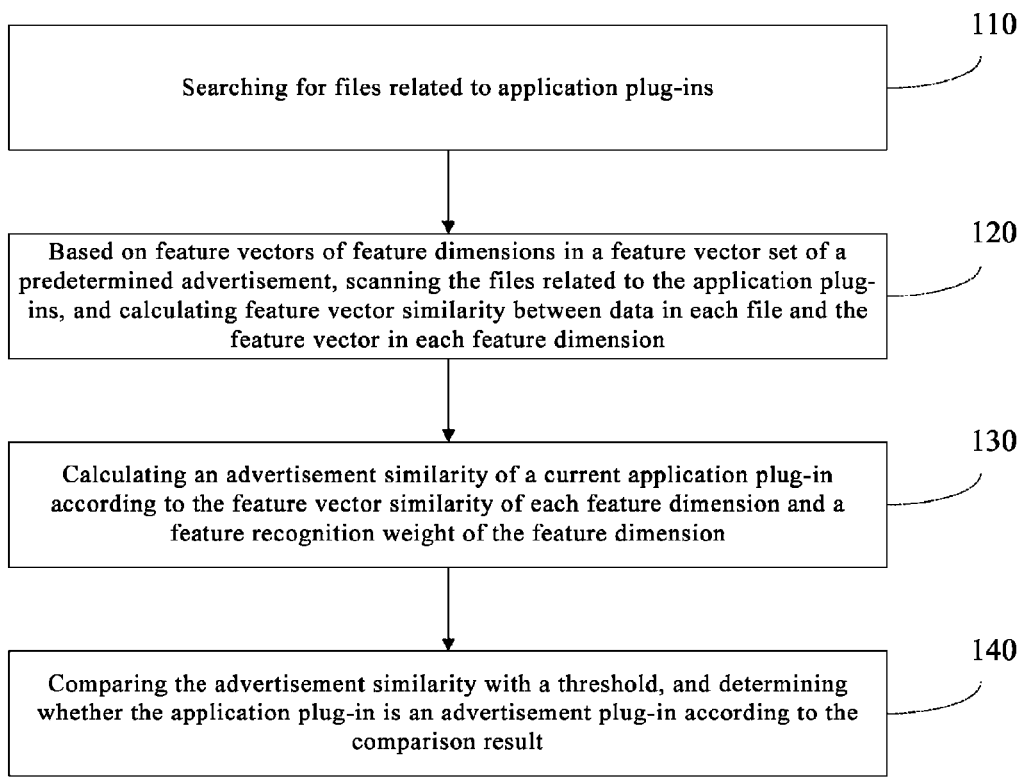
FIG. 1 schematically shows a schematic flow chart of a method for recognizing advertisement plug-ins according to a first embodiment of the invention.

With reference to FIG. 1, it shows a schematic flow chart of a method for recognizing advertisement plug-ins according to the first embodiment of the invention. The method may particularly include:

Step 110, searching for files related to application plug-ins;

In this embodiment of the invention, when a newly installed application plug-in is recognized, an installation package of the application plug-in and a release position of the installation package may be sought. For example, a plug-in of an application is stored in a SD card (Secure Digital Memory Card) of a mobile phone (for example, in a root directory) as SD:\A file, and files released by the installed application plug-in are stored in SD:\program\ml file in the SD card of the mobile phone, which may contain configuration files and executable files (for example, .Dex file that generally is an executable file for Android system).

In addition, for files the installation package of which is removed after being installed, files such as configuration files and executable files at a position where the application plug-in is installed and released may be scanned.

Preferably, Step 110 may include: searching for files related to application plug-ins in the intelligent mobile terminal.

That is to say, the invention is directed to the application plug-ins in the intelligent mobile terminal, such as APP plug-ins in the smart phone.

Step 120, based on feature vectors in feature dimensions in a feature vector set of a predetermined advertisement, scanning the files related to the application plug-ins, and calculating feature vector similarity between data in each file and the feature vector in each feature dimension;

Preferably, in the invention, the method may further include:

Step S100, analysing each application plug-in in an advertisement sample library through a cloud server to obtain feature data in each feature dimension, and building the feature vector set of advertisement according to the feature data.

In the embodiment of the invention, the feature vector set of advertisements D (d1, d2, d3 . . . dn) may be built in advance, wherein n is a number of feature vectors, and each of feature vectors corresponds to a feature matching condition. Examples thereof are as follows.

Dimension Feature Vector of Constant Pool

Plug-in specified advertisement features may be recognized by the character string constant pool. For example, character strings of version numbers of some plug-ins and character strings of Internet domain names of advertisement plug-ins may be stored in the constant pool.

Then in this dimension, for example, 100 character strings may be obtained by counting of the constant pool of advertisement software, wherein there are a variety of character condition combinations. For example, when character string condition such as character string A and character string B, character string C or character string D or character string E, a not character string F exists, it may be determined to belong to a feature vector in constant value dimension of advertisement plug-ins. In that case, "character string A and character string B, character string C or character string D or character string E, not character string F" is used as a feature matching condition of this feature vector.

2) Dimension Feature Vector of Package Name and Class Name

Each of the advertisement plug-ins may contain specified package name and class name which may be used to determine the presence of specified advertisement plug-ins. However, since some advertisement plug-ins may be obfuscated with obfuscation of advertisement application host, the package name and a type feature value should be selected as the class name which can not be obfuscated, such as the class name of service module contained in the plug-in and the class name of advertisement View.

3) Dimension Feature Vector of Configuration Information

It is information stated in a list file and configuration. Some advertisement plug-ins may state required information in this file. The recognition rate can be improved by the feature. Some advertisement plug-ins may store information such as AppKey of the advertisement plug-in for example in AndroidMenifest.xml or customized configuration files. Herein, AppKey is a unique ID, which is provided for a developer from an advertisement provider.

4) Dimension Feature Vector of Class Inheritance Relation Sequence

In a special application scenario, the advertisement plug-in recognition may be required to accurately recognize an advertisement module in a program installation package rather than the presence of advertisement. At this time some modules may inheritably originated from a certain known advertisement module. In this case, the inheritance relation sequence can be used to determine whether they are advertisement modules.

Then in this dimension, for example, it is counted that the class inheritance relation used for recognizing the advertisement software is class a→class b→class c, or class a→class b→class d, and in that case, "class a→class b→class c, or class a→class b→class d" is the feature matching condition in this dimension.

5) Dimension Feature Vector of Function Calling Sequence

A function calling sequence maybe determined by scanning program codes and the presence of suspicious advertisement send behaviors can be determined by analysing the function calling sequence.

Then in this dimension, for example, it is counted that the function calling sequence used for recognizing the advertisement software is function a→function b→function c+function d, or classf→class b>function c+function d, and in that case, "function a→function b→function c+function d, or class f→class b>function c+functiond" is the feature matching condition in this dimension.

6) Dimension Feature Vector of Installation Package

For example, for such a module that has been determined to be an advertisement, this feature can be determined by delivering md5 of its installation package.

aforesaid feature vectors may be obtained by analysing and counting each of application plug-in samples in the advertisement plug-in sample library by the cloud. For example, for 1) to 5), each of application plug-ins may be analysed by:

scanning configuration files, to obtain from the configuration files each statement information in a configuration information dimension in the feature vector set of the advertisement as a first feature vector;

scanning constant pools in the executable files, to obtain from the constant pools each character string in a constant pool dimension in the feature vector set of the advertisement as a first feature vector;

scanning class structure in the executable files, to obtain from the class structure each package name and class name in a package name and class name dimension in the feature vector set of the advertisement as a first feature vector;

scanning class structure in the executable files, to obtain from the class structure each class inheritance relation in a class inheritance relation sequence dimension in the feature vector set of the advertisement as a first feature vector;

scanning method descriptors in the executable files, to obtain from the method descriptors each function calling sequence in a function calling sequence dimension in the feature vector set of the advertisement as a first feature vector.

Taking the .Dex file as an example of the executable file, a position of the class structure may be located by .Dex file head index and deviation value such that the package name and the class name can be extracted from the structure. Further, class inheritance relation maybe found according to parent-child inheritance relation of each class. In addition, a position of the method descriptor can be found according to the .Dex file head index and the deviation value. The method descriptor records calling relation between functions of various methods during the execution of the plug-in. In that case, the function calling relation can be sought.

For 6), cloud data may be applied to the advertisement software with a large amount of users to implement feature semantic analysis, achieving a goal of prompt and accurate recognition. The feature recognition manners in 1) to 5) may be suitable to most of situations. Features special to the installation package is more in connection with cloud data. For example, the plug-in that has been determined to be an advertisement by the cloud and feedback of users can be determined whether to be an advertisement plug-in by delivering md5 of its installation package.

In addition, the method may further include:

Step S121, according to feedback information on application plug-ins by users, supplementing the application plug-ins fed back as containing advertisement into the advertisement application plug-in sample library.

That is, the feedback on a variety of software by the users may be continuously received, and the plug-ins fed back as advertisement plug-ins up to a certain amount may be added to the advertisement sample library according to a result of feedback, so as to constantly improve data source and increase the accuracy of the feature vector set of the advertisement.

Optionally, the method may further include: pre-compiling the feature vector set of advertisement built by feature data in each feature vector dimension as a binary XML format on the cloud server.

The feature data may be pre-compiled as the binary xml format. Firstly, this may provide a relatively prompt parsing speed, suitably for parsing on a device having lower memory and lower CPU such as cell phone device. Secondly, since the character strings such as redundant attribute names and elements in the xml file are placed into a public character string pool and quoted by an index, sizes of data files may be significantly reduced, suitably to network and especially to mobile network transmission. In this embodiment of the invention, after the feature vector set of advertisement is built, it may proceed with Step 120.

Optionally, the step of, based on feature vectors in the feature dimension in the feature vector set of the predetermined advertisement, scanning the files related to the application plug-ins and calculating a feature vector similarity between data in each file and the feature vector in each feature dimension may include:

Step A11, according to a scanning position specified by each feature dimension in the feature vector set of the predetermined advertisement, obtaining the feature data in the corresponding feature dimension;

Since it is necessary to scan specified files or specified positions to obtain each of feature vectors, then it is required to scan scanning position specified by the feature dimensions in the feature vector set of the predetermined advertisement to obtain feature data in corresponding feature dimensions.

Optionally, the step of, according to a scanning position specified by feature dimensions in the feature vector set of the predetermined advertisement, obtaining feature data in corresponding feature dimensions, may include:

Step b11, scanning the installation package of the application plug-in, to obtain from the installation package each feature information in an installation package dimension in the feature vector set of the advertisement as a first feature vector;

For example, this step may include: scanning the installation package corresponding to the application plug-in, calculating a md5 value thereof, and setting an md5 value as a feature value of the feature vector in the installation package dimension.

And/or, Step b12, scanning the configuration files, to obtain from the configuration files each statement information in a configuration information dimension in the feature vector set of the advertisement as a first feature vector;

For example, this step may include: from a release position of the installation package of the scanned files, scanning the configuration files obtained by releasing the installation package, such as the configuration file, AndroidMenifest.xml, from which the statement information, such as AppKey, is extracted as a feature value of the feature vector in the dimension.

And/or, Step b13, scanning constant pools in the executable files, to obtain from the constant pools each character string in a constant pool dimension in the feature vector set of the advertisement as a first feature vector;

Plug-in specified advertisement features may be recognized by the character string constant pool. For example, character strings of version numbers of some plug-ins and character strings of Internet domain names of advertisement plug-ins may be stored in the constant pool. Then, character strings, such as the character strings of version numbers of plug-ins and the character strings of Internet domain names of advertisement plug-ins, obtained in this step may be used as the feature value of the feature vector in this dimension.

And/or, Step b14, scanning class structure in the executable files, to obtain from the class structure each package name and class name in a package name and class name dimension in the feature vector set of the advertisement as a first feature vector;

For example, this step may include: scanning .Dex files obtained by releasing the application plug-in installation package, searching for class structure therein, and obtaining package name and the class name from the class structure as a feature value of the feature vector in the package name and class name dimension.

And/or, Step b15, scanning class structure in the executable files, to obtain from the class structure each class inheritance relation in a class inheritance relation sequence dimension in the feature vector set of the advertisement as a first feature vector;

For example, this step may include: scanning .Dex files obtained by releasing the application plug-in installation package, searching for class structure therein, and extracting class inheritance relation sequence from directivity relation and inheritance relation of class in the class structure as a feature value in the class inheritance relation sequence dimension.

And/or, Step b16, scanning method descriptors in the executable files, to obtain from the method descriptors each function calling sequence in a function calling sequence dimension in the feature vector set of the advertisement as a first feature vector.

For example, this step may include: scanning .Dex files obtained by releasing the application plug-in installation package, searching for method descriptors therein, and extracting function calling relation sequence from function calling relation recorded by the method descriptors as the feature value in a function calling relation sequence dimension.

Step A12, calculating a feature vector similarity between the feature data and a feature value of the feature vector in the corresponding feature dimension in the feature vector set of the advertisement to obtain the feature vector similarity in the feature dimension.

After the feature data in feature dimensions is obtained by scanning, the feature vector similarity between the feature data and the feature value of the feature vector in the corresponding feature dimension in the feature vector set of the advertisement is calculated to obtain the feature vector similarity in the feature dimension.

Optionally, the step of, calculating a feature vector similarity between the feature data and a feature value of the feature vector in the corresponding feature dimension in the feature vector set of the advertisement to obtain the feature vector similarity in the feature dimension, may include:

Step b17, matching the feature data with each feature matching condition corresponding to the feature vector in the corresponding feature dimension in the feature vector set of the advertisement, and calculating the feature vector similarity in the feature dimension according to a result of matching.

For example, for the matching condition "character string A and character string B, character string C or character string D or character string E, not character string F" in the constant pool feature dimension in the feature vector set of the advertisement, if character strings A, C, N is obtained by scanning a current constant pool of the application plug-in, the matching condition "character string C or character string D or character string E, not character string F" is completely met and the similarity can be calculated as ⅔.

For each aforesaid feature dimension, after the feature vector similarity of each feature dimension i is calculated, a feature vector similarity set $S(s1, s2, si, \ldots sn)(i=1, 2 \ldots n)$ of the plug-in can be obtained, wherein si is ranged from 0 to 1, 0 indicates complete dissimilarity, and 1 indicates complete matching.

Step 130, calculating an advertisement similarity of a current application plug-in according to the feature vector similarity of each feature dimension and a feature recognition weight of the feature dimension;

In the invention, a corresponding feature recognition weight may be set for each feature dimension, and the feature vector similarity and the corresponding feature recognition weight may be brought into a feature vector similarity calculation function f to calculate the advertisement similarity V of the current application plug-in. For example, for the preset feature vector set $D(d1, d2, d3, \ldots dn)$ of the advertisement wherein n is a number of the feature vectors, the weight $W(w1, w2, w3, \ldots wn)$ corresponding to the feature vector set of the advertisement can be preset.

Particularly, when a scanning accuracy is tested in practice, in most cases the similarity calculation function f is degraded to conform to the condition even using a weighted average; also it is considered that the calculation of the weighted average is simple and fast and has less floating point arithmetic, which is suitable for intelligent mobile terminal devices such as mobile phone. That is, $v=s1*w1+s2*w2+\ldots+sn*wn$.

Step 140, comparing the advertisement similarity with a threshold, and determining whether the application plug-in is an advertisement plug-in according to the comparison result.

In this embodiment of the invention, an advertisement similarity threshold t may be further set; when $v>t$, whether the application plug-in is an advertisement plug-in may be determined.

Optionally, the method may further include:

Step C11, recording the scanning determining result of each application plug-in; and when scanning again, according to the record of the scanning determining result of each application plug-in, skipping scanning of the determined application plug-ins.

In this embodiment of the invention, there is a possibility of re-installing the system of the invention in the intelligent mobile terminal, or re-installing an installed application plug-in. In above cases, then fast scanning and determining may be performed on scanned and determined application plug-ins according to the recorded scanning determining result.

Applicable scenarios of the invention may include:

1) A final user may initiate scanning on a smart machine, such that the user may see all advertisement software and behaviors thereof and may choose to remove the software or provide an advertisement block module with block data.

2) Software can be scanned on a platform (for example, application market) of the intelligent mobile terminal. In this way, the user may know whether the software is advertisement software and behaviors thereof before downloading and installing it.

This embodiment of the invention has a perfect feature recognition rule, feature recognition can be implemented in conjunction with cloud data, advertisement software can be recognized in a precise and accurate way, there is a superior feature matching and recognition capability for obfuscated advertisement software codes, and recognition rate of the advertisement plug-ins can be improved.

This embodiment of the invention can analyse feature data in various feature dimensions for the application plug-ins of smart terminal and comprehensively determine whether the application plug-ins contain the advertisement plug-ins in conjunction with feature data in various feature dimensions. As a result, it is possible to solve problems in the prior art that the advertisement plug-ins cannot be recognized in an accurate way, advertisement plug-in recognition cannot be performed on an obfuscated application and the advertisement plug-in recognition rate is lower. Also, it is possible to achieve the advantageous effects that a perfect feature recognition rule is involved, feature recognition can be implemented in conjunction with cloud data, advertisement software can be recognized in a precise and accurate way, there is a superior feature matching and recognition capability for obfuscated advertisement software codes, and effective behavior detection can be implemented for the recognized advertisement plug-ins.

Second Embodiment

Figure 2:
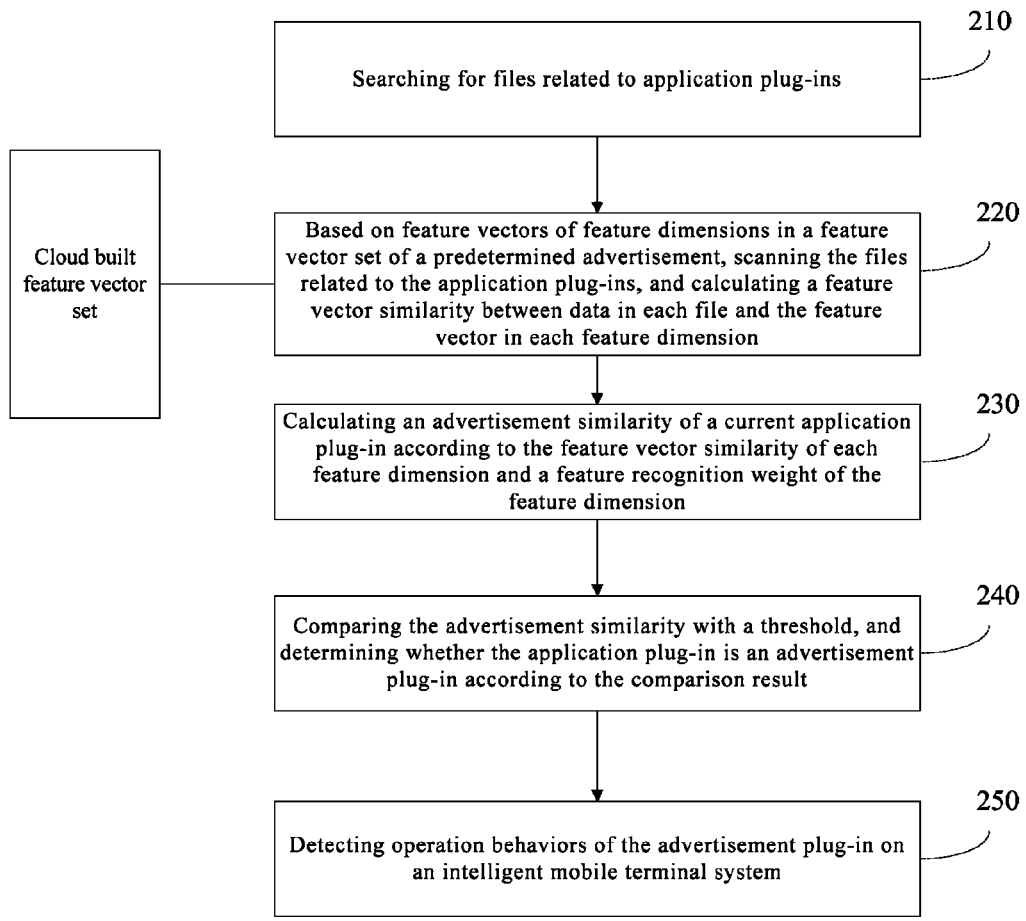
FIG. 2 schematically shows a schematic flow chart of a method for recognizing advertisement plug-ins according to a second embodiment of the invention.

With reference to FIG. 2, it shows a schematic flow chart of a method for recognizing advertisement plug-ins according to a second embodiment of the invention. The method may particularly include:

Step 210, searching for files related to application plug-ins;

Step 220, based on feature vectors in feature dimensions in a feature vector set of a predetermined advertisement, scanning the files related to the application plug-ins, and calculating a feature vector similarity between data in each file and the feature vector in each feature dimension, wherein the feature vector set of the advertisement is built and sent by a cloud server;

Step 230, calculating an advertisement similarity of a current application plug-in according to the feature vector similarity of each feature dimension and a feature recognition weight of the feature dimension;

Step 240, comparing the advertisement similarity with a threshold, and determining whether the application plug-in is an advertisement plug-in according to the comparison result;

Step 250, if the application plug-in is an advertisement plug-in, then detecting operation behaviors of the advertisement plug-in on an intelligent mobile terminal system.

Step 210 to Step 240 in this embodiment of the invention is essentially similar to those in the first embodiment, and thus detailed description thereof will be omitted herein.

For Step 250, in this embodiment of the invention, an advertisement behavior analysis engine can be provided to implement behavior detection on advertisement plug-ins. For example, it is detected whether the advertisement plug-ins request to grab advertisement content from network in operation, whether extract private information of users and whether transmission of private information is caused by external network. As another example, an active defense engine may real-time monitor sensitive API (Application Programming Interface) calling of the advertisement software, such as API calling of reading SMS, or description of the plug-in behaviors from the advertisement feature, such as description of the function calling sequence; or the plug-in codes are statically analysed to determine whether to call the sensitive API, such as API calling of reading contacts. This behavior detection can be real-time detected on the intelligent mobile terminal so as to inform the user, or can be pre-detected on the platform of the application plug-ins to subsequently inform the user.

With the advertisement plug-ins effectively recognized, this embodiment of the invention may implement behavior detection especially for advertisement plug-ins, and apprise the user of advertisement behaviors of current advertisement plug-in.

Naturally, the invention may also block subsequent operation behaviors of the advertisement plug-in. For example, after the API calling of reading SMS content is detected, the invention can block the calling of the advertisement plug-in for detailed advertisement content. Other behaviors are processed in a similar manner.

This embodiment of the invention has a perfect feature recognition rule, feature recognition can be implemented in conjunction with cloud data, advertisement software can be recognized in a precise and accurate way, there is a superior feature matching and recognition capability for obfuscated advertisement software codes, recognition rate of the advertisement plug-ins can be improved, and further the behaviors of the advertisement plug-ins can be detected.

Third Embodiment

Figure 3:
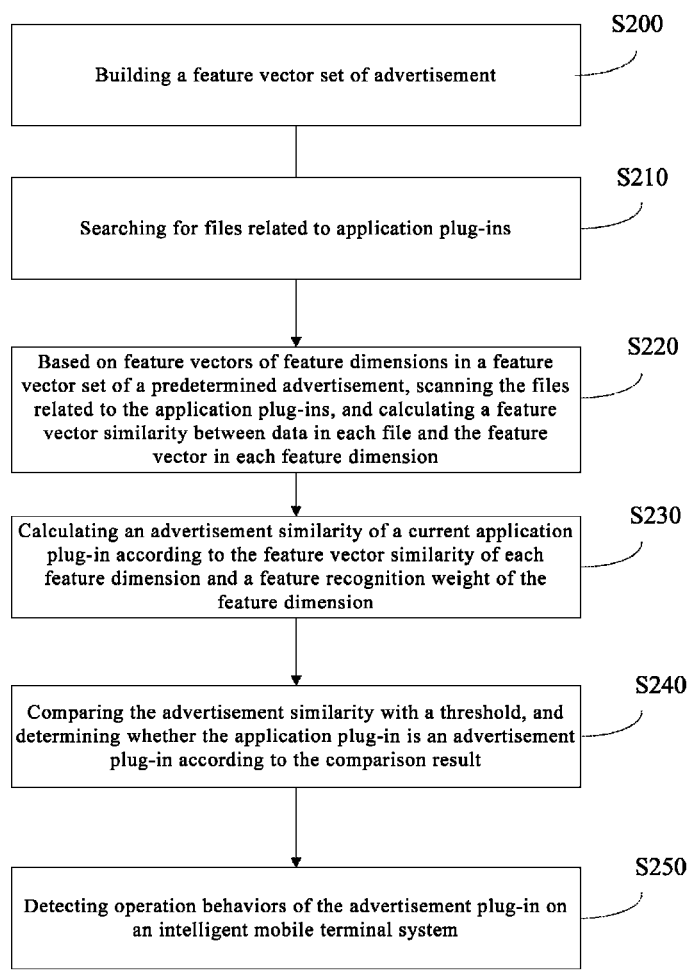
FIG. 3 schematically shows a schematic flow chart of a method for recognizing advertisement plug-ins according to a third embodiment of the invention.

With reference to FIG. 3, it shows a schematic flow chart of a method for recognizing advertisement plug-ins according to a third embodiment of the invention. The method may particularly include:

Step S200, building a feature vector set of advertisement;

Step S210, searching for files related to application plug-ins on an application platform of the intelligent mobile terminal;

That is to say, the invention is directed to searching the application platform of the intelligent mobile terminal for the application plug-ins, such as a variety of APPs on the application platform of the intelligent mobile terminal.

Step S220, based on feature vectors of feature dimensions in a feature vector set of a predetermined advertisement, scanning the files related to the application plug-ins, and calculating feature vector similarity between data in each file and the feature vector in each feature dimension;

Step S230, calculating an advertisement similarity of a current application plug-in according to the feature vector similarity of each feature dimension and a feature recognition weight of the feature dimension;

Step S240, comparing the advertisement similarity with a threshold, and determining whether the application plug-in is an advertisement plug-in according to the comparison result;

Step S250, if the application plug-in is an advertisement plug-in, then detecting operation behaviors of the advertisement plug-in on an intelligent mobile terminal system.

When an intelligent mobile terminal (such as, mobile phone terminal) of a user downloads an application plug-in which is recognized as an advertisement plug-in, the user may be informed, for example, that this application plug-in is an advertisement plug-in and its advertisement behaviors include SMS calling, contacts calling, and the like.

This embodiment is mainly involved in advertisement recognition and processing of the application plug-ins implemented on the mobile phone platform. Therefore, if behavior detection performed on the advertisement plug-ins requires real-time information of the user, this behavior may temporarily not be detected and other detection manners may be similar to those of the second embodiment.

The steps of this embodiment, which are similar to those of the second embodiment, also have similar principles thereto, detailed description of which will be omitted herein.

This embodiment of the invention has a perfect feature recognition rule, feature recognition can be implemented in conjunction with cloud data, advertisement software can be recognized in a precise and accurate way, there is a superior feature matching and recognition capability for obfuscated advertisement software codes, recognition rate of the advertisement plug-ins can be improved, and behaviors of the advertisement plug-ins can be pre-detected on the application platform.

Fourth Embodiment

Figure 4:
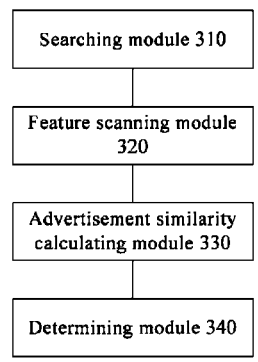
FIG. 4 schematically shows a schematic block diagram of a system for recognizing advertisement plug-ins according to a fourth embodiment of the invention.

With reference to FIG. 4, it shows a schematic block diagram of a system for recognizing advertisement plug-ins according to a fourth embodiment of the invention. The system may particularly include:

a searching module 310, configured to search for files related to application plug-ins;

a feature scanning module 320, configured to, based on feature vectors of feature dimensions in a feature vector set of a predetermined advertisement, scan the files related to the application plug-ins, and calculate feature vector similarity between data in each file and the feature vector in each feature dimension;

an advertisement similarity calculating module 330, configured to calculate an advertisement similarity of a current application plug-in according to the feature vector similarity of each feature dimension and a feature recognition weight of the feature dimension; and a determining module 340, configured to compare the advertisement similarity with a threshold, and determine whether the application plug-in is an advertisement plug-in according to the comparison result.

Herein, the searching module may include:

a first searching module, configured to search for files related to application plug-ins on an application platform of the intelligent mobile terminal.

Optionally, the system may further include:

a cloud server, the cloud server includes:

a feature vector set building module, configured to analyse each application plug-in in an advertisement sample library through a cloud server to obtain feature data in each feature dimension, and build the feature vector set of advertisement according to the feature data.

Optionally, the cloud server may further include:

a feedback supplementing module, configured to, according to feedback information on application plug-ins by users, supplement the application plug-ins fed back as containing advertisement into the advertisement application plug-in sample library.

Optionally, the system may further include:

a feature vector set converting module, configured to pre-compile the feature vector set of advertisement built by feature data in each feature dimension as a binary XML format on the cloud server.

Optionally, the feature scanning module may include:

a feature data extracting module, configured to, according to a scanning position specified by each feature dimension in the feature vector set of the predetermined advertisement, obtain the feature data in the corresponding feature dimension; and a feature data analysing module, configured to calculate a feature vector similarity between the feature data and a feature value of the feature vector in the corresponding feature dimension in the feature vector set of the advertisement to obtain the feature vector similarity in the feature dimension.

Optionally, the feature data extracting module may include:

an application plug-in scanning module, configured to scan the installation package of the application plug-in, to obtain from the installation package each feature information in an installation package dimension in the feature vector set of the advertisement as a first feature vector;

and/or, a configuration information dimension obtaining module, configured to scan the configuration files, to obtain from the configuration files feature values matching with those in a configuration information dimension in the feature vector set of the predetermined advertisement;

and/or, a constant pool dimension obtaining module, configured to scan constant pools in the executable files, to obtain from the constant pools character strings matching with those in a constant pool dimension in the feature vector set of the predetermined advertisement;

and/or, a package name and class name obtaining module, configured to scan class structure in the executable files, to obtain from the class structure each package name and class name in a package name and class name dimension in the feature vector set of the advertisement as a first feature vector;

and/or, a class inheritance relation dimension obtaining module, configured to scan class structure in the executable files, to obtain from the class structure class inheritance relations matching with those in a class inheritance relation sequence dimension in the feature vector set of the predetermined advertisement;

and/or, a function calling sequence dimension obtaining module, configured to scan method descriptors in the executable files, to obtain from the method descriptors function calling sequences matching with those in a function calling sequence dimension in the feature vector set of the predetermined advertisement.

Optionally, the feature data analysing module may include: a first analysing module, configured to match the feature data with each feature matching condition corresponding to the feature vector in the corresponding feature dimension in the feature vector set of the advertisement, and calculate the feature vector similarity in the feature dimension according to a result of matching.

Optionally, the system may further include:

a recording module, configured to record a scanning determining result of each application plug-in;

Moreover, the system may further include: a rapid scanning module, configured to, when scanning again, according to a record of the scanning determining result of each application plug-in, skip scanning of the determined application plug-ins.

Fifth Embodiment

Figure 5:
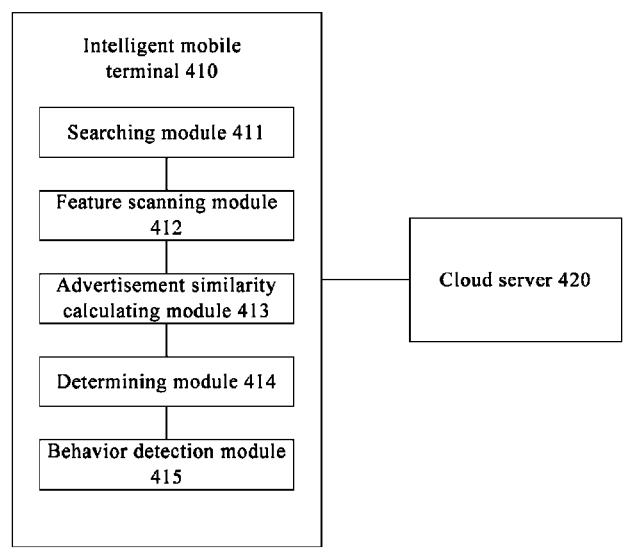
FIG. 5 schematically shows a schematic block diagram of a system for recognizing advertisement plug-ins according to a fifth embodiment of the invention.
Figure 6:
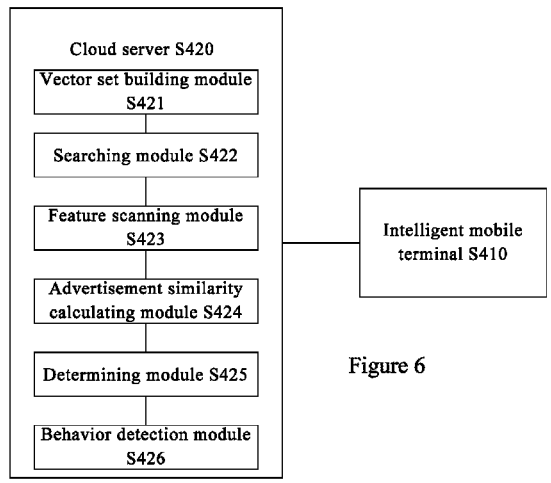
FIG. 6 schematically shows a schematic block diagram of a system for recognizing advertisement plug-ins according to a sixth embodiment of the invention.

With reference to FIG. 5, it shows a schematic block diagram of a system for recognizing advertisement plug-ins according to a fifth embodiment of the invention. The system may particularly include:

an intelligent mobile terminal 410 and a cloud server 420;

the intelligent mobile terminal may include:

a searching module 411, configured to search for files related to application plug-ins;

a feature scanning module 412, configured to, based on feature vectors of feature dimensions in a feature vector set of a predetermined advertisement, scan the files related to the application plug-ins, and calculate a feature vector similarity between data in each file and the feature vector in each feature dimension;

an advertisement similarity calculating module 413, configured to, calculate an advertisement similarity of a current application plug-in according to the feature vector similarity in each feature dimension and a feature recognition weight of the feature dimension;

a determining module 414, configured to compare the advertisement similarity with a threshold, and determine whether the application plug-in is an advertisement plug-in according to the comparison result; and a behaviour detection module 415, configured to, after determining whether the application plug-in is an advertisement plug-in, detect operation behaviors of the advertisement plug-in on an intelligent mobile terminal system.

This embodiment is similar to the fourth embodiment, detailed description of which will be omitted herein.

A sixth embodiment shows a schematic block diagram of a system for recognizing advertisement plug-ins according to the fifth embodiment of the invention. The system may particularly include:

an intelligent mobile terminal S410 and a cloud server S420;

the cloud server S420 may include:

a vector set building module S421, configured to build a feature vector set of advertisement;

a searching module S422, configured to search for files related to application plug-ins;

a feature scanning module S423, configured to, based on feature vectors of feature dimensions in a feature vector set of a predetermined advertisement, scan the files related to the application plug-ins, and calculate feature vector similarity between data in each file and the feature vector in each feature dimension;

an advertisement similarity calculating module S424, configured to calculate an advertisement similarity of a current application plug-in according to the feature vector similarity in each feature dimension and a feature recognition weight in the feature dimension;

a determining module S425, configured to compare the advertisement similarity with a threshold, and determine whether the application plug-in is an advertisement plug-in according to the comparison result;

a behaviour detection module S426, configured to, after determining whether the application plug-in is an advertisement plug-in, detect operation behaviors of the advertisement plug-in on an intelligent mobile terminal system.

In the intelligent mobile terminal, when the intelligent mobile terminal downloads an application plug-in which is recognized as an advertisement plug-in, the user may be informed.

This embodiment is similar to the fifth embodiment, detailed description of which will be omitted herein.

Each member embodiment of the present invention can be realized by hardware, or realized by software modules running on one or more processors, or realized by the combination thereof. A person skilled in the art should understand that a microprocessor or a digital signal processor (DSP) may be used in practical use to realize some or all the functions of some or all the members of the apparatus for recognizing advertisement plug-ins according to the embodiments of the present invention. The present invention may be further realized as some or all the equipments or device programs for executing the methods described herein (for example, computer programs and computer program products). This program for realizing the present invention may be stored in computer readable medium, or have one or more signal forms. These signals may be downloaded from the Internet website, or be provided by carrying signals, or be provided in any other manners.

Figure 7:
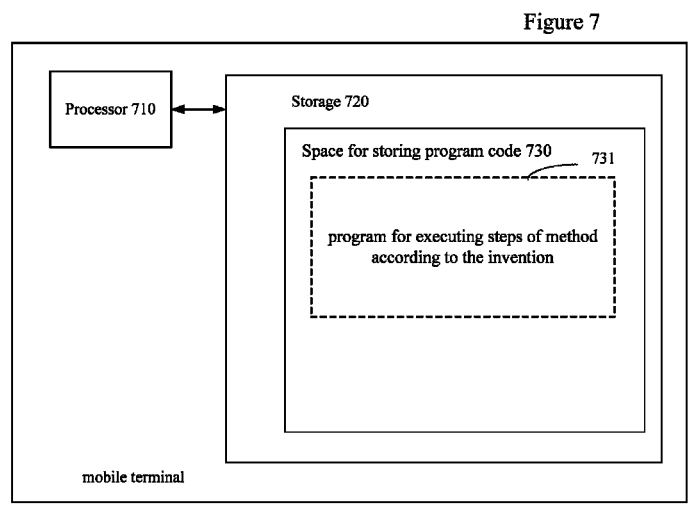
FIG. 7 schematically shows a block diagram of a movable terminal for executing the methods according to the invention.
Figure 8:
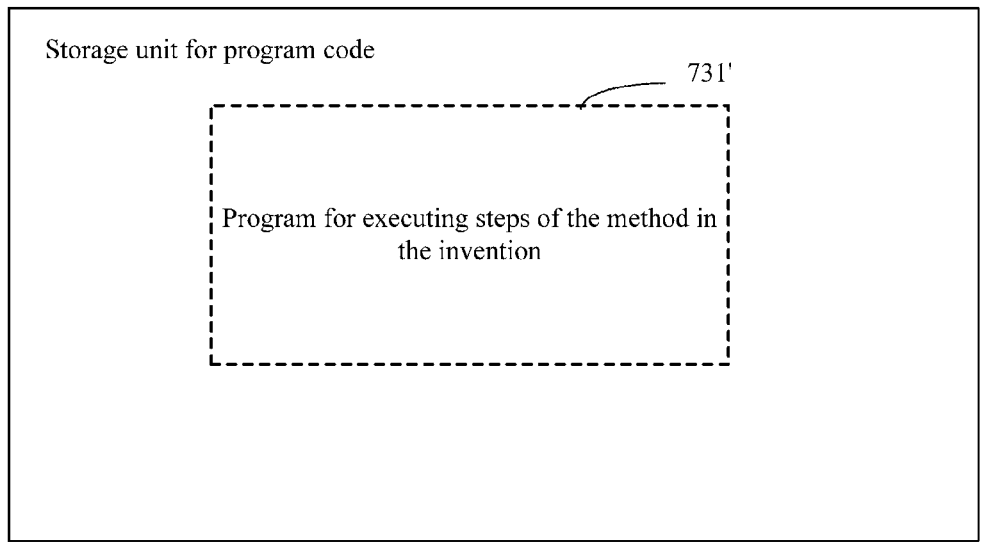
FIG. 8 schematically shows a storage unit for saving or carrying program code for realizing the methods according to the invention.

For example, FIG. 7 is a block diagram schematically showing a movable terminal for executing the method of the invention. The movable terminal conventionally includes a processor 710 and a computer program product or computer readable medium in the form of storage 720. The storage 720 may be an electronic memory such as a flash memory, EEPRPOM (electrically erasable programmable read-only memory), EPROM (electrically programmable read-only memory), hard disk or ROM (read-only memory). The storage 720 has a storage space 730 for storing program code for executing any of the steps in the above method. For example, the storage space 730 for storing the program code may include each program code 731 for realizing steps in the above methods respectively. The program code may be read out from one or more computer program product or write in one or more computer program product. The computer program product includes program code carrier such as hard disk, compact disk (CD), storage card, or soft disk. The computer program product is usually a portable or non-portable storage unit shown in FIG. 8. The storage unit may have similar-arranged memory paragraph, memory space and the like as the storage 720 of the movable terminal FIG. 7. The program code may be, for example, compacted in propriate form. Generally, the storage unit includes a computer readable code 731', that is, the code which may be read by processor such as the processor 710. When the program code is executed by the movable terminal, the movable terminal is made to execute the steps in the methods above.

The "an embodiment", "embodiment" or "one or more embodiment" in the specification means, specified features, structures or characteristics described in combination with the embodiment are included in at least one embodiment. In addition, it should be noted that, the term "in an embodiment" may not only point to the same embodiment.

In the specification provided herein, a lot of details are described. However, it should be understood, the embodiments of the invention may be practiced without the details. In some embodiments, the well-known method, structure and technology are not shown detailedly, in order not to confuse people to understand the application.

It should be noticed that the above-described embodiments are intended to illustrate but not to limit the present invention, and alternative embodiments can be devised by the person skilled in the art without departing from the scope of claims as appended. In the claims, any reference symbols between brackets form no limit to the claims. The wording "comprising" is not meant to exclude the presence of elements or steps not listed in a claim. The wording "a" or "an" in front of element is not meant to exclude the presence of a plurality of such elements. The present invention may be realized by means of hardware comprising a number of different components and by means of a suitably programmed computer. In the unit claim listing a plurality of devices, some of these devices may be embodied in single hardware. The wordings "first", "second", and "third", etc. do not denote any order. These wordings can be interpreted as names.

In addition, the words and sentences used in the specification is mainly for the purpose of readability and teaching, rather than explaining or limiting the subject of invention. Thusly, modifications and amendment are obvious to an ordinary skilled person in the art without deviating the scope and spirit of the appended claims. To the scope of the invention, the disclosure to the invention is illustrative rather than restrictive, the scope of the invention is limited by the appended claims.

The invention claimed is:

1. A method for recognizing advertisement plug-ins, comprising:
   searching for files related to an application plug-in;
   based on feature vectors in feature dimensions in a feature vector set of predetermined advertisements, scanning the files related to the application plug-in, and calculating a feature vector similarity between data in each file and the feature vector in each feature dimension, wherein the step of, based on feature vectors in feature dimensions in the feature vector set of the predetermined advertisements, scanning the files related to the application plug-in, and calculating a feature vector similarity between data in each file and the feature vector in each feature dimension, comprises:
   according to a scanning position specified by each feature dimension in the feature vector set of the predetermined advertisements, obtaining data related to the application plug-in in a corresponding feature dimension, and calculating the feature vector similarity between the data related to the application plug-in and a feature value of the feature vector in the corresponding feature dimension in the feature vector set of the predetermined advertisements to obtain the feature vector similarity in the feature dimension;
   calculating an advertisement similarity of the application plug-in according to the feature vector similarity in each feature dimension and a feature recognition weight in each feature dimension; and
   comparing the advertisement similarity with a threshold; and
   after determining that the application plug-in is an advertisement plug-in according to a comparison result, monitoring and detecting operation behaviors of the advertisement plug-in on an intelligent mobile terminal system.

2. The method according to claim 1, further comprising:
   analysing each application plug-in in an advertisement sample library through a cloud server to obtain feature data in each feature dimension, and building the feature vector set of the predetermined advertisements according to the feature data.

3. The method according to claim 2, further comprising:
   according to feedback information on application plug-ins by users that the application plug-ins contain advertisements, supplementing the application plug-ins into the advertisement sample library.

4. The method according to claim 2, further comprising:
   pre-compiling the feature vector set of the predetermined advertisements built according to the feature data in each feature dimension as a binary XML format on the cloud server.

5. The method according to claim 1, wherein the step of, according to a scanning position specified by each feature dimension in the feature vector set of the predetermined advertisements, obtaining data related to the application plug-in in a corresponding feature dimension, comprises at least one of the following:
   scanning an installation package of the application plug-in, to obtain from the installation package each piece of feature information in an installation package dimension in the feature vector set of the predetermined advertisements;
   scanning configuration files, to obtain from the configuration files each piece of statement information in a configuration information dimension in the feature vector set of the predetermined advertisements;
   scanning constant pools in executable files, to obtain from the constant pools each character string in a constant pool dimension in the feature vector set of the predetermined advertisements;
   scanning class structure in the executable files, to obtain from the class structure each package name and class name in a package name and class name dimension in the feature vector set of the predetermined advertisements;
   scanning the class structure in the executable files, to obtain from the class structure each class inheritance relation in a class inheritance relation sequence dimension in the feature vector set of the predetermined advertisements;
   scanning method descriptors in the executable files, to obtain from the method descriptors each function calling sequence in a function calling sequence dimension in the feature vector set of the predetermined advertisements.

6. The method according to claim 1, wherein the step of, calculating a feature vector similarity between the data related to the application plug-in and a feature value of the feature vector in the corresponding feature dimension in the feature vector set of the predetermined advertisements to obtain the feature vector similarity in the feature dimension, comprises:

matching the data related to the application plug-in with each feature matching condition corresponding to the feature vector in the corresponding feature dimension in the feature vector set of the predetermined advertisements, and calculating the feature vector similarity in the feature dimension according to a result of matching.

7. The method according to claim 1, further comprising: recording a scanning determining result of each application plug-in; and when scanning again, according to the record of the scanning determining result of each application plug-in, skipping scanning of the determined application plug-ins.

8. The method according to claim 1, wherein the step of searching for files related to an application plug-in, comprises:

searching for files related to the application plug-in on an application platform of an intelligent mobile terminal.

9. A system for recognizing advertisement plug-ins, comprising:

a processor; and
a memory for storing instructions executable by the processor, wherein the processor upon executing the instructions is configured to:
search for files related to an application plug-in;
based on feature vectors in feature dimensions in a feature vector set of predetermined advertisements, scan the files related to the application plug-in, and calculate a feature vector similarity between data in each file and the feature vector in each feature dimension, wherein the processor is further configured to:
according to a scanning position specified by each feature dimension in the feature vector set of the predetermined advertisements, obtain data related to the application plug-in in a corresponding feature dimension, and
calculate the feature vector similarity between the data related to the application plug-in and a feature value of the feature vector in the corresponding feature dimension in the feature vector set of the predetermined advertisements to obtain the feature vector similarity in the feature dimension;
calculate an advertisement similarity of the application plug-in according to the feature vector similarity in each feature dimension and a feature recognition weight in each feature dimension; and
compare the advertisement similarity with a threshold; and
after determining that the application plug-in is an advertisement plug-in according to a comparison result, monitoring and detecting operation behaviors of the advertisement plug-in on an intelligent mobile terminal system.

10. The system according to claim 9, wherein the processor is further configured to:

analyse each application plug-in in an advertisement sample library through a cloud server to obtain feature data in each feature dimension, and build the feature vector set of the predetermined advertisements according to the feature data.

11. The system according to claim 10, wherein the processor is further configured to:

according to feedback information on application plug-ins by users that the application plug-ins contain advertisements, supplement the application plug-ins into the advertisement sample library.

12. The system according to claim 10, wherein the processor is further configured to:

pre-compile the feature vector set of the predetermined advertisements built according to the feature data in each feature dimension as a binary XML format on the cloud server.

13. The system according to claim 9, wherein the processor is further configured to:

scan an installation package of the application plug-in, to obtain from the installation package each piece of feature information in an installation package dimension in the feature vector set of the predetermined advertisements;
scan configuration files, to obtain from the configuration files feature values matching with those in a configuration information dimension in the feature vector set of the predetermined advertisements;
scan constant pools in executable files, to obtain from the constant pools character strings matching with those in a constant pool dimension in the feature vector set of the predetermined advertisements;
scan class structure in the executable files, to obtain from the class structure each package name and class name in a package name and class name dimension in the feature vector set of the predetermined advertisements;
scan the class structure in the executable files, to obtain from the class structure class inheritance relations matching with those in a class inheritance relation sequence dimension in the feature vector set of the predetermined advertisements;
scan method descriptors in the executable files, to obtain from the method descriptors function calling sequences matching with those in a function calling sequence dimension in the feature vector set of the predetermined advertisements.

14. The system according to claim 9, wherein the processor is further configured to:

match the data related to the application plug-in with each feature matching condition corresponding to the feature vector in the corresponding feature dimension in the feature vector set of the predetermined advertisements, and calculate the feature vector similarity in the feature dimension according to a result of matching.

15. The system according to claim 9, wherein the processor is further configured to:

record a scanning determining result of each application plug-in; and
when scanning again, according to a record of the scanning determining result of each application plug-in, skip scanning of the determined application plug-ins.

16. The system according to claim 9, wherein the processor is further configured to:

search for files related to the application plug-in on an application platform of an intelligent mobile terminal.

17. A non-transitory computer readable medium, which stores therein a computer program that, when executed by one or more processors of a system for recognizing advertisement plug-ins, causes the system to perform:

searching for files related to an application plug-in;
based on feature vectors in feature dimensions in a feature vector set of predetermined advertisements, scanning the files related to the application plug-in, and calculating a feature vector similarity between data in each file and the feature vector in each feature dimension, wherein the step of, based on feature vectors in feature dimensions in the feature vector set of the predetermined advertisements, scanning the files related to the application plug-in, and calculating a feature vector similarity between data in each file and the feature vector in each feature dimension, further comprises:
according to a scanning position specified by each feature dimension in the feature vector set of the predetermined advertisements, obtaining data related to the application plug-in in a corresponding feature dimension, and
calculating the feature vector similarity between the data related to the application plug-in and a feature value of the feature vector in the corresponding feature dimension in the feature vector set of the predetermined advertisements to obtain the feature vector similarity in the feature dimension;
calculating an advertisement similarity of the application plug-in according to the feature vector similarity in each feature dimension and a feature recognition weight in each feature dimension; and
comparing the advertisement similarity with a threshold; and
after determining that the application plug-in is an advertisement plug-in according to a comparison result, monitoring and detecting operation behaviors of the advertisement plug-in on an intelligent mobile terminal system.

* * * * *